United States Patent [19]

McDonald et al.

[11] 4,337,227
[45] Jun. 29, 1982

[54] RECOVERY OF CHROMIUM FROM WASTE SOLUTIONS

[75] Inventors: Hector O. McDonald; Lawrence C. George, both of Rolla, Mo.

[73] Assignee: The United States of America as represented by the Secretary of the Interior, Washington, D.C.

[21] Appl. No.: 300,834

[22] Filed: Sep. 10, 1981

[51] Int. Cl.$^3$ ............................................. C01G 37/02
[52] U.S. Cl. ........................................ 423/55; 423/53
[58] Field of Search ................................. 423/53, 55; 260/438.5 C

[56] References Cited

U.S. PATENT DOCUMENTS

| | | |
|---|---|---|
| 873,809 | 12/1907 | Brumt ................................. 423/55 |
| 3,579,555 | 5/1971 | Pangonis ....................... 260/438.5 C |

FOREIGN PATENT DOCUMENTS

| | | |
|---|---|---|
| 47-17697 | 9/1972 | Japan ................................. 423/55 |
| 970494 | 9/1964 | United Kingdom ......... 260/438.5 C |

Primary Examiner—Herbert T. Carter
Attorney, Agent, or Firm—William S. Brown; Donald A. Gardiner

[57] ABSTRACT

Chromium is selectively precipitated from waste solutions by means of benzoate ion. The resulting chromium benzoate complex is separated, washed and treated with either base or sulfuric acid to recover the benzoate and a chromium hydroxide product.

3 Claims, No Drawings

RECOVERY OF CHROMIUM FROM WASTE SOLUTIONS

This invention relates to recovery of a usable chromium product from wastes such as waste solutions from plating and etching processes. Conventional recovery processes usually involve reduction of any $Cr^{+6}$ to $Cr^{+3}$, followed by addition of alkali to precipitate chromium and other metallic hydroxides. The resulting sludge is usually landfilled. However, in addition to creating environmental problems, this disposal method wastes potentially high-value secondary resources.

It has now been found, according to the process of the invention, that chromium may be selectively precipitated from plating and etching wastes by means of benzoate ion. The chromium is recovered as an insoluble benzoate complex, with other impurities remaining in solution. The benzoate ion, as sodium or ammonium benzoate, is recovered and recycled, and the chromium is converted to the hydroxide for recycle to operations such as stainless steel-making. Thus, chromium is separated from the waste solutions with minimal contamination from other cations in the waste. In addition, the chromium benzoate precipitate, due to its crystallinity, is much more readily filtered and washed than the hydroxides of conventional processes.

The feed solutions in the process of the invention are typically aqueous solutions containing chromium in amounts of about 25 g/l to 50 g/l, and they may contain varying amounts of other contaminating metals, such as zinc, copper and iron. Any $Cr^{+6}$ in the feed is initially reduced to $Cr^{+3}$ by means of standard techniques such as use of $SO_2$, $NaHSO_3$, $Na_2SO_3$ or paper pulp treatment. The pH of the solution is then adjusted to about 3 to 4 for efficient and selective precipitation of the chromium. Adjustment of the pH is preferably with ammonium hydroxide, although sodium hydroxide may also be used.

Benzoate ion is then added in the form of sodium benzoate, or a mixture of sodium and ammonium benzoates. Sodium benzoate is preferably employed as a 1 to 2 molar solution, while ammonium benzoate is used as a 0.5 to 1 molar solution. Where a mixture of the two is used, the ratio of sodium to ammonium benzoate should be about 2:1 to 1:1. Use of the mixture facilitates maintenance of the proper pH since the combination acts as a buffer system. Benzoate ion is preferably added in an amount about 1.5 times the stoichiometric amount necessary for precipitation of the chromium. The reaction is as follows:

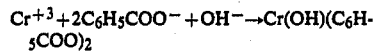

The chromium benzoate precipitate is separated by conventional means, and is washed with hot water (about 80° to 90° C.) or warm (about 50° C.) ammonium nitrate solution (1 M) to remove zinc salts occluded in the precipitate. The precipitate is then treated with base to recover the benzoate and form a chromium hydroxide product according to the following reaction:

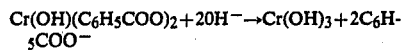

The base is preferably sodium hydroxide or carbonate or both, and is employed in an amount about 2 to 3 times the stoichiometric amount necessary to convert the chromium benzoate to the hydroxide, while solubilizing the benzoate. The benzoate solution is separated from the chromium hydroxide residue, and may then be recycled for reaction with additional chromium-bearing waste. The chromium hydroxide product is generally suitable for recycle to operations such as stainless steel-making.

Alternatively, the chromium benzoate precipitate may be treated with sulfuric acid, rather than with base. In this procedure, the chromium dissolves, and insoluble benzoic acid forms according to the following reaction:

The benzoic acid is separated and reacted with base to produce a benzoate solution which may then be recycled as above. The benzoate-free solution is reacted with base to precipitate chromium hydroxide which is also recycled as above.

The invention will be more specifically illustrated by the following example.

EXAMPLE

An aqueous waste etchant was initially treated by addition of solid $Na_2SO_3$ to reduce $Cr^{+6}$ to $Cr^{+3}$, and copper values were recovered from the waste by reaction with zinc dust. This resulted in an aqueous waste containing 36.9 g/l $Cr^{+3}$, 22.0 g/l Zn and 290 g/l $SO_4^=$ and having a pH of 1.2. A 50 ml sample of the wastes was pipetted into a 2-liter beaker along with about 150 ml of distilled water. The pH of the sample was raised to 3.5 by addition of $NH_4OH$. The mixture was then heated to about 80° C., and this temperature was maintained as 40 ml of 1 M ammonium benzoate solution was added with stirring.

Sufficient distilled water was then added to dilute the mixture to about ½ of the initial Cr concentration in order to facilitate precipitation of the blue-green chromium benzoate product. After heating for 15 minutes, 75 ml of 2 M sodium benzoate was added with stirring to complete precipitation of chromium benzoate. The pH of the slurry at this point was 4.0.

The slurry was cooled to approximately 50° C. and filtered through filter paper. The filter cake was washed 3 times with 50 ml portions of distilled water at about 80° C. Analysis of the filter cake and filtrate showed that the former contained 98.9 percent of the chromium and 14.3 percent of the zinc in the original waste sample.

A 10.5 gram sample of the chromium benzoate filter cake was placed in a 500 ml beaker and 30 ml of 1.5 M sodium carbonate and 50 ml of 1 M sodium hydroxide was added. The mixture was stirred and heated for 60 minutes, while the color changed from blue-green to grayish blue-green. The mixture was then filtered and washed with distilled water. The resulting product consisted of 51 percent $Cr(OH)_3$ and 6.0 percent $Zn(OH)_2$.

We claim:
1. A process for recovery of chromium from waste solutions comprising:
   (a) reducing any $Cr^{+6}$ in the solution to $Cr^{+3}$,
   (b) adjusting the pH of the solution to about 3 to 4,
   (c) treating the solution with sodium benzoate, or a mixture of sodium and ammonium benzoates, to precipitate the chromium as a benzoate complex, and
(d) separating the precipitate from the solution.

2. The process of claim 1 including the additional steps of:
(e) washing the chromium benzoate precipitate to remove occluded zinc salts,
(f) treating the washed precipitate with sodium hydroxide or carbonate to form (1) a solution of sodium benzoate and (2) an insoluble chromium hydroxide product, and
(g) separating the chromium hydroxide product from the benzoate solution.

3. The process of claim 1 including the additional steps of:
(e) washing the chromium benzoate precipitate to remove occluded zinc salts,
(f) treating the washed precipitate with sulfuric acid to form (1) a solution of chromium sulfate and (2) insoluble benzoic acid,
(g) separating the benzoic acid from the chromium sulfate solution, and
(h) treating the benzoic acid and the chromium sulfate solutions with base to form benzoate solution and chromium hydroxide product.

* * * * *